United States Patent
Park et al.

(10) Patent No.: US 9,723,250 B2
(45) Date of Patent: Aug. 1, 2017

(54) METHOD FOR OBTAINING IMAGE DATA AND ELECTRONIC DEVICE FOR PROCESSING METHOD THEREOF

(71) Applicant: Samsung Electronics Co., Ltd., Suwon-si, Gyeonggi-do (KR)

(72) Inventors: Hang-Kyu Park, Seoul (KR); Seung-Kyung Lim, Seoul (KR); Dae-Sung Kim, Seoul (KR); So-Ra Kim, Seoul (KR); Hyun-Kyoung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/147,893

(22) Filed: Jan. 6, 2014

(65) Prior Publication Data

US 2014/0192232 A1 Jul. 10, 2014

(30) Foreign Application Priority Data

Jan. 4, 2013 (KR) .......................... 10-2013-0001028

(51) Int. Cl.
*H04N 5/76* (2006.01)
*H04N 5/232* (2006.01)

(52) U.S. Cl.
CPC .......... *H04N 5/76* (2013.01); *H04N 5/23206* (2013.01); *H04N 5/23216* (2013.01)

(58) Field of Classification Search
CPC ... H04N 5/76; H04N 5/23201; H04N 5/23206
USPC ......... 348/218.1, 222.1, 231.2, 231.3, 231.4, 348/207.99; 396/49; 382/118
See application file for complete search history.

(56) References Cited

U.S. PATENT DOCUMENTS

| | | | |
|---|---|---|---|
| 2005/0036044 A1* | 2/2005 | Funakura | G06K 9/00228 348/239 |
| 2008/0024614 A1 | 1/2008 | Li et al. | |
| 2009/0128635 A1 | 5/2009 | Baek et al. | |
| 2009/0251482 A1* | 10/2009 | Kondo | H04N 5/2624 345/589 |
| 2011/0058058 A1* | 3/2011 | Steinberg | G06K 9/00228 348/222.1 |
| 2012/0075496 A1* | 3/2012 | Akifusa | H04N 1/00183 348/222.1 |
| 2012/0075503 A1* | 3/2012 | Akifusa | H04N 5/772 348/231.99 |
| 2013/0235224 A1* | 9/2013 | Park | H04N 5/23222 348/218.1 |
| 2014/0192212 A1* | 7/2014 | He et al. | 348/211.11 |

FOREIGN PATENT DOCUMENTS

CN 101552874 A 10/2009

* cited by examiner

*Primary Examiner* — Mekonnen Dagnew
(74) *Attorney, Agent, or Firm* — Jefferson IP Law, LLP

(57) ABSTRACT

A method and an apparatus for recording image data in an electronic device are provided. The method includes storing image data of different directions obtained via a plurality of cameras. In the method for storing image data in an electronic device, first image data and second image data are obtained. A state of an object of the second image data is determined while the first image data is stored. When the state of the object of the second image data meets a certain condition, the second image data is stored together with the first image data.

21 Claims, 9 Drawing Sheets

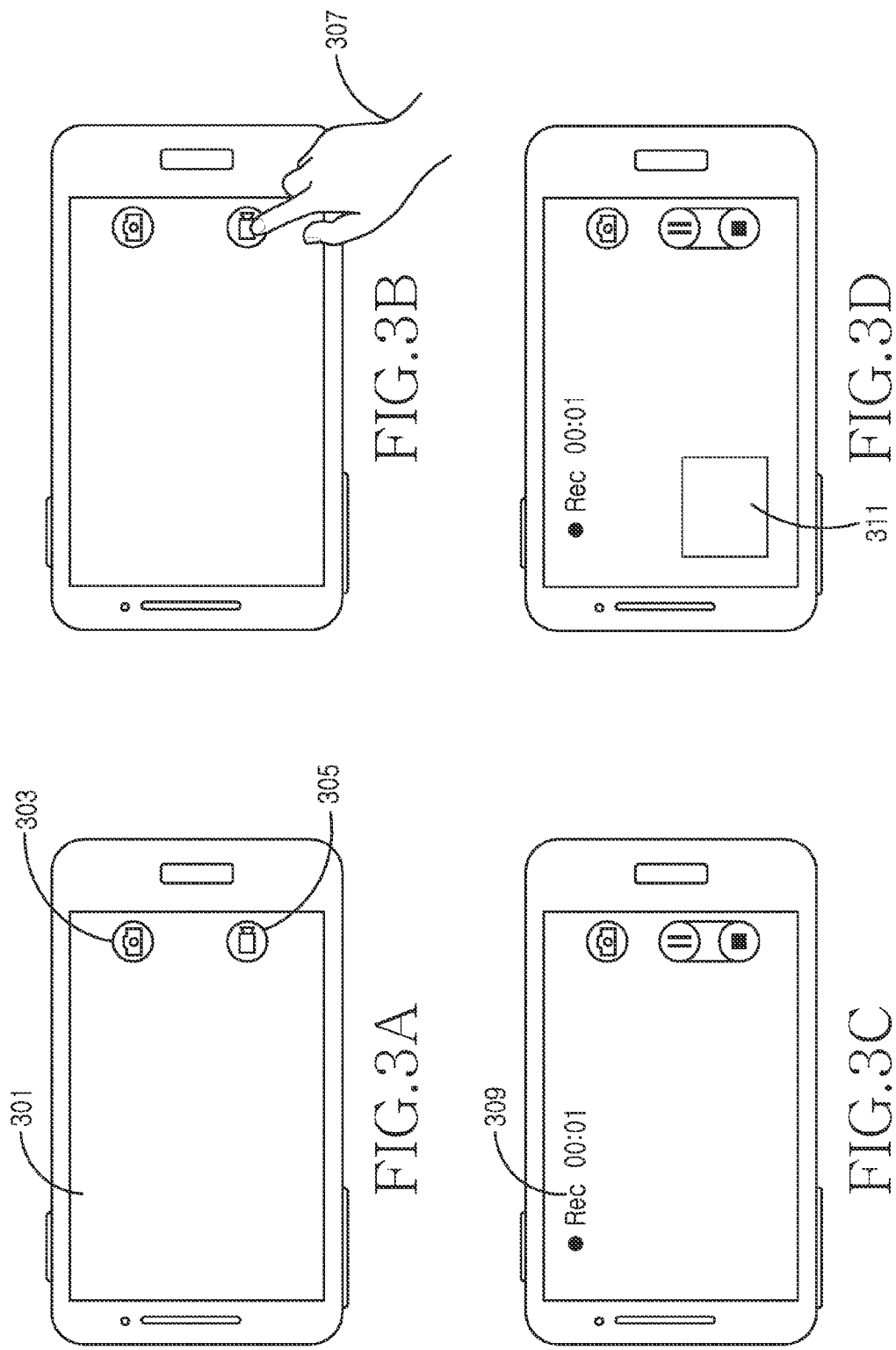

METHOD FOR OBTAINING IMAGE DATA AND ELECTRONIC DEVICE FOR PROCESSING METHOD THEREOF

CROSS-REFERENCE TO RELATED APPLICATION(S)

This application claims the benefit under 35 U.S.C. §119(a) of a Korean patent application filed on Jan. 4, 2013 in the Korean Intellectual Property Office and assigned Serial No. 10-2013-0001028, the entire disclosure of which is hereby incorporated by reference.

TECHNICAL FIELD

The present disclosure relates to a method and an apparatus for recording image data in an electronic device. More particularly, the present disclosure relates to a method and an apparatus for storing image data of different directions obtained via a plurality of cameras simultaneously.

BACKGROUND

With rapid technological advancements of electronic devices, an electronic device enabling wireless voice communication and information exchange has become a daily necessity. In an early stage of electronic device distribution, the electronic device has been simply recognized as a terminal that can be carried and that enables wireless communication. However, since the introduction of a wireless Internet, the electronic device is not only used for the purpose of simple telephone communication and schedule management, but also expands its utilization range, such as games, a remote controller using a short distance communication, and capturing an image using a built-in camera, meeting a user's need.

As described above, as the electronic device provides a multimedia service, information that should be processed and information that should be displayed increase. Accordingly, an interest in an electronic device having a touchscreen capable of increasing the size of a display unit by improving space utilization increases.

The touchscreen is an input and a display unit for performing input and display of information on one screen. Accordingly, in a case of using the touchscreen, the electronic device may increase a display area by removing a separate input unit, such as a keypad. For example, in a case of using a full-touch display where the touchscreen is applied to an entire screen, the electronic device may utilize the entire surface of the electronic device as a screen to expand a screen size.

Such an electronic device has a camera to provide a function for displaying image data on a display unit. For example, the electronic device may capture an object to display it as a moving image and a still image, and may store the captured data or transmit it to other persons in the form of a multimedia message, and the like.

Generally, the electronic device disposes a camera in its front side and its backside, may capture a user image (i.e., a user's face) using the camera disposed in the front side, and capture a background image using the camera disposed in the backside.

In addition, the electronic device may select desired image data via a camera switching menu. For example, the electronic device may store video data or image data obtained via one of the cameras disposed in the front side and the backside.

This means that image data obtained via the camera disposed in the backside and image data obtained via the camera disposed in the front side cannot be stored as one image data simultaneously, and only selective image data may be stored via the camera switching menu.

A user desires to store image data where the user himself/herself has been captured together with image data regarding a background image, but the user cannot store image data regarding the user himself/herself and the image data regarding the background image simultaneously due to the above limited function.

For example, the user may capture image data regarding a background image using the camera disposed in the backside and store the same. In a case where the user explains image data currently being stored, the electronic device processes to allow the camera disposed in the front side to operate using a camera switching menu.

Accordingly, the electronic device may suspend an operation of the camera capturing the backside and capture the user image explaining the background image using the switched camera and store the same. For example, the background image and the user image are stored in turns.

Therefore, a need exists for a method and an apparatus for simultaneously storing image data captured at various angles when storing image data in an electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for simultaneously storing image data captured at various angles when storing image data in an electronic device.

Another aspect of the present disclosure is to provide a method and an apparatus for simultaneously storing main image data and sub image data at a point meeting a certain condition while storing the main image data in an electronic device.

Another aspect of the present disclosure is to provide a method and an apparatus for applying a weight to main audio data and sub audio data in a case of simultaneously storing main image data and sub image data in an electronic device.

In accordance with an aspect of the present disclosure, a method for storing image data in an electronic device is provided. The method includes obtaining first image data and second image data, determining a state of an object of the second image data while storing the first image data, and when the state of the object of the second image data meets a certain condition, storing the second image data together with the first image data.

Storing the second image data together with the first image data may include merging the second image data with the first image data, and displaying the merged image data.

Merging the second image data with the first image data may include changing at least one of a size, a position, and a shape of a region with which the second image data is merged.

Storing the second image data together with the first image data may include extracting audio data from the first image data and the second image data, and after applying a weight to the extracted audio data, synthesizing the weight-applied audio data in the image data.

Obtaining first image data and second image data may include obtaining the first image data and the second image data using a plurality of cameras having different capturing directions, respectively.

Obtaining first image data and second image data may include obtaining the first image data and the second image data using one camera.

In accordance with another aspect of the present disclosure, an electronic device is provided. The electronic device includes a display, and at least one processor, wherein the processor is configured to obtain first image data and second image data, to determine a state of an object of the second image data while storing the first image data, and when the state of the object of the second image data meets a certain condition, to process to store the second image data together with the first image data.

The processor may process to merge the second image data with the first image data and display the merged image data.

The processor may process to change at least one of a size, a position, and a shape of a region with which the second image data is merged.

The processor may process to extract audio data from the first image data and the second image data, apply a weight to the extracted audio data, and synthesize the weight-applied audio data in image data.

The processor may process to obtain the first image data and second image data using a plurality of cameras having different capturing directions, respectively.

The processor may process to obtain the first image data and the second image data using one camera.

In accordance with another aspect of the present disclosure, a computer-readable storage medium storing one or more programs is provided. The one or more programs include instructions, when executed by an electronic device, for allowing the electronic device to obtain first image data and second image data, determine a state of an object of the second image data while storing the first image data, and when the state of the object of the second image data meets a certain condition, store the second image data together with the first image data.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings in which:

FIGS. 3A, 3B, 3C, and 3D are views illustrating a screen of an electronic device storing image data according to an embodiment of the present disclosure;

Throughout the drawings, like reference numerals will be understood to refer to like parts, components and structures.

DETAILED DESCRIPTION

Figure 1:
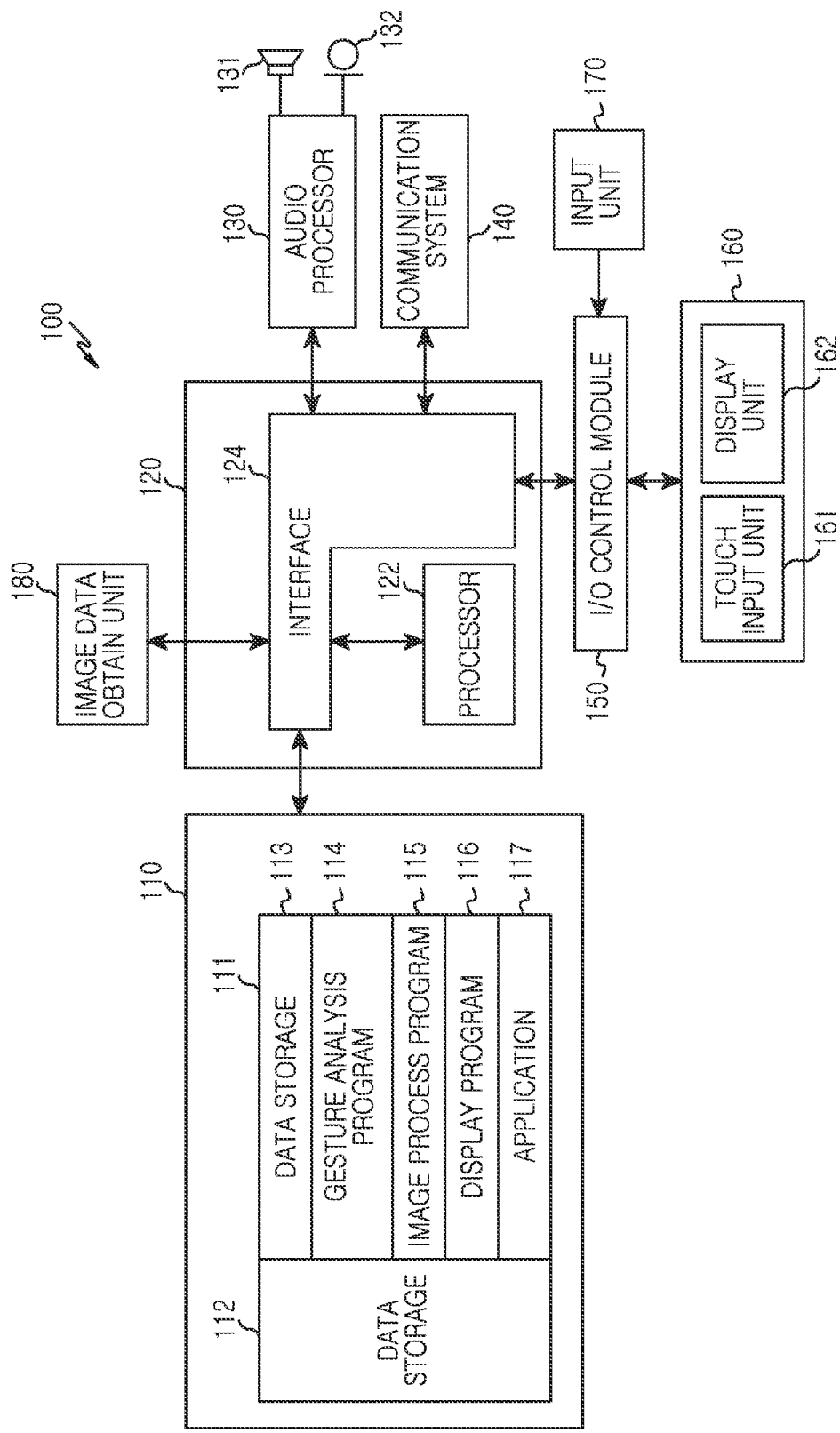
FIG. 1 is a block diagram illustrating a construction of an electronic device providing an image data storage function according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present disclosure relates to a method and an apparatus for storing image data of different directions obtained via a plurality of cameras simultaneously.

Hereinafter, description is made of a method and an apparatus for simultaneously storing main image data and sub image data at a point meeting a certain condition while storing the main image data in order to simultaneously store image data captured at various angles when an electronic device stores image data.

In addition, the image data may include not only moving image data but also still image data.

In addition, a gesture in the present specification denotes forming a touch pattern on a touchscreen of the electronic device. For example, a touch is performed on the touchscreen of the electronic device by an input means, such as a user's finger, a stylus pen, and the like. Gesture denotes that a drag of a pattern is performed with a touch that is maintained on the touchscreen. For example, gesture denotes that a drag and a release of a touch are performed while a touch is maintained.

In addition, the electronic device may be a portable electronic device, and may be an apparatus, such as a portable terminal, a mobile phone, a media player, a tablet computer, a handheld computer, a Personal Digital Assistant (PDA), or the like. In addition, the electronic device may be an arbitrary portable electronic device including an apparatus combining two or more functions among these devices.

FIG. 1 is a block diagram illustrating a construction of an electronic device providing an image data storage function according to an embodiment of the present disclosure.

Referring to FIG. 1, an electronic device 100 may include a memory 110, a processor unit 120, an audio processor 130, a communication system 140, an Input/Output (I/O) controller 150, a touchscreen 160, and an input unit 170. Here, at least one of the above mentioned elements may be plural. For example, the electronic device 100 may include a plurality of memories or a plurality of communication systems.

The memory 110 may include a program storage 111 for storing a program for controlling an operation of the electronic device 100 and a data storage 112 for storing data occurring during execution of a program. For example, the data storage 112 may store various updatable data for storage, such as a phonebook, calling messages, received messages, and the like. According to an embodiment of the present disclosure, the data storage 112 may store information used for determining a period for simultaneously storing main image data and sub image data. Here, the main image data denotes image data obtained by capturing an object which a user desires to store using a first camera. The main image data may be displayed on a display unit and stored in the memory simultaneously until an event for ending image data storing occurs.

The sub image data denotes image data obtained by capturing an object detected at an angle different from the main image data using a second camera. Unlike the main image data, the sub image data may be displayed on the display unit and stored together with the main image data at a period meeting a certain condition.

In addition, the program storage 111 may include an Operating System (OS) program 113, a gesture analysis program 114, an image process program 115, a display program 116, and at least one application 117. Here, programs included in the program storage 111 is a set of instructions and may be expressed as an instruction set.

The OS program 113 may include various software elements for controlling a general system operation. The control of this general system operation denotes, for example, memory management and control, storage hardware (device) control and management, power control and management, and the like. The OS program 113 also performs a function for swift communication between various hardware (devices) and program elements (modules).

The gesture analysis program 114 analyzes a user's gesture for controlling the electronic device. Here, analyzing the user's gesture may be the same as detecting the user's gesture.

For example, the gesture analysis program 114 may detect a gesture of the user who selects a camera capturing main image data.

In addition, the gesture analysis program 114 may analyze image data besides the user's gesture. For example, the gesture analysis program 114 may analyze temporarily stored sub image data to determine a period at which main image data and sub image data should be stored simultaneously. For example, the gesture analysis program 114 may determine a state (i.e., a user's face, voice (audio data), a body movement, and the like) of an object included in the sub image data.

The gesture analysis program 114 may detect the user's gesture for changing the position of a region where sub image data merges.

The gesture analysis program 114 may detect the user's gesture for changing the size of a region where sub image data merges.

The gesture analysis program 114 may detect the user's gesture for transforming the shape of a region where sub image data merges while storing image data.

The gesture analysis program 114 may transfer the detected user's gesture to the image process program 115 and the display program 116.

When determining a period at which the main image data and the sub image data should be stored simultaneously, the image process program 115 may process to merge the main image data with the sub image data.

Here, merging the main image data and the sub image data denotes performing image processing such that the main image data and the sub image data may be displayed simultaneously. It may be incorporating the sub image data into a portion of the main image data.

When detecting the user's gesture for editing image data which the user desires to store among image data, the image processing program 115 may process to apply an editing effect to the main image data or the sub image data. Here, applying the editing effect to the image data may be changing the position and the size of a region of the main image data where the sub image data will merge.

The image process program 115 may change the shape of a region of the main image data while storing image data to merge the sub image data.

In a case of simultaneously storing main image data and sub image data while storing image data, the image process program 115 processes to extract audio data from the main image data and the sub image data and apply a weight to each audio data. Thereafter, the image process program 115 may process to synthesize the weight-applied audio data in each image data.

The display program 116 may include various software elements for providing and displaying graphics on the touchscreen 160. The term graphics may include text, a web page, an icon, a digital image, a video, an animation, and the like.

In addition, the display program 116 may include various software elements related to a user interface.

In a case where an event for allowing main image data and sub image data to be simultaneously stored while image data is stored occurs, the display program 116 may process to display image data where the main image data and the sub image data have merged.

For example, the display program 116 may display main image data obtained via the first camera on the display unit. In the case where an event for allowing the main image data and sub image data to be simultaneously stored occurs, the display program 116 may process to display the main image data obtained via the first camera and the sub image data obtained via the second camera on the display unit.

The application 117 may include a software element regarding at least one application installed in the electronic device 100.

A program included in the program storage 211 may be allowed to operate via hardware configuration. The electronic device 100 may include a gesture analysis module, an image process module, a display module, and the like.

The processor unit 120 may include at least one processor 122 and an interface 124. Here, the processor 122 and the interface 124 may be integrated in at least one integrated circuit or implemented as separate elements.

The interface 124 performs a role of a memory interface controlling an access to the processor 122 and the memory 110.

The interface 124 may perform a role of a peripheral interface for controlling connection between I/O peripherals of the electronic device 100 and the processor 122.

The processor 122 may control the electronic device 100 to perform a function for simultaneously storing main image data and sub image data using at least one software program. At this point, the processor 122 may control to execute at least one program stored in the memory 110 and perform a function corresponding to a relevant program. For example, the processor 122 may include a graphics processor for merging main image data and sub image data depending on a state (detection of a face, detection of a voice, a lip movement, and the like, of a user) of an object included in image data.

According to an embodiment of the present disclosure, the image data storing function of the electronic device 100 may be performed using a software, such as a program stored in the memory 110, or a hardware, such as the graphics processor.

The audio processor 130 may provide an audio interface between a user and the electronic device 100 via a speaker 131 and a microphone 132.

The communication system 140 performs a communication function for voice communication and data communication of the electronic device 100. At this point, the communication system 140 may be divided into a plurality of communication sub modules for supporting different communication networks, respectively. For example, though not limited thereto, the communication network may include a Global System for Mobile Communication (GSM) network, an Enhanced Data GSM Environment (EDGE) network, a Code Division Multiple Access (CDMA) network, a Wide (W)-CDMA network, a Long Term Evolution (LTE) network, an Orthogonal Frequency Division Multiple Access (OFDMA) network, a wireless LAN, a Bluetooth network, and Near Field Communication (NFC), and the like.

The I/O controller 150 may provide an interface between an I/O unit, such as the touchscreen 160, the input unit 170, and the like, and the interface.

The touchscreen 160 is an I/O unit for performing output of information and input of information, and may include a touch input unit 161 and a display unit 162.

The touch input unit 161 may provide touch information detected via a touch panel to the processor unit 120 via the I/O controller 150. At this point, the touch input unit 161 changes touch information to an instruction structure, such as touch_down, touch_move, and touch_up, and provides the same to the processor unit 120. According to an embodiment of the present disclosure, the touch input unit 161 may generate a user's gesture for controlling storing of image data. Here, controlling storing of the image data denotes allowing main image data and sub image data to be simultaneously stored, and may be changing the position and the size of a main image data region with which sub image data is to merge.

The display unit 162 may display state information of the electronic device 100, a character input by a user, a moving image, a still image, and the like. For example, the display unit 162 may display image data which a user desires to store. According to an embodiment, the display unit 162 may display image data obtained via a first camera and a second camera, and when an event for allowing the main image data and the sub image data to be simultaneously stored occurs, the display unit 162 may display image data where the main image data and the sub image data have merged.

The input unit 170 may provide input data generated by a user's selection to the processor unit 120 via the I/O controller 150. For example, the input unit 170 may include a control button for controlling the electronic device 100. In another example, the input unit 170 may be configured using a keypad for receiving input data from a user, and may generate the user's input data controlling storing of image data.

An image data obtain unit 180 is a module for obtaining image data and may include at least two cameras according to an embodiment of the present disclosure. For example, the image data obtain unit 180 may include a first camera for obtaining main image data and a second camera for obtaining sub image data. These cameras may be disposed in different directions, respectively, to obtain image data corresponding to each direction. According to an embodiment of the present disclosure, the first camera may be disposed in the front side of the electronic device to obtain image data, and the second camera may be disposed in the backside of the electronic device to obtain image data.

Though not shown, the electronic device 100 may further include elements for providing additional functions, such as a broadcast reception module for receiving broadcasting, a digital sound source reproduce module, such as a Motion Pictures Expert Group (MPEG-1 or MPEG-2) Audio Layer 3 (MP3) module, a short distance wireless communication module for short distance wireless communication, a proximity sensor module for proximity detection, and the like, and software for their operation.

Figure 2:
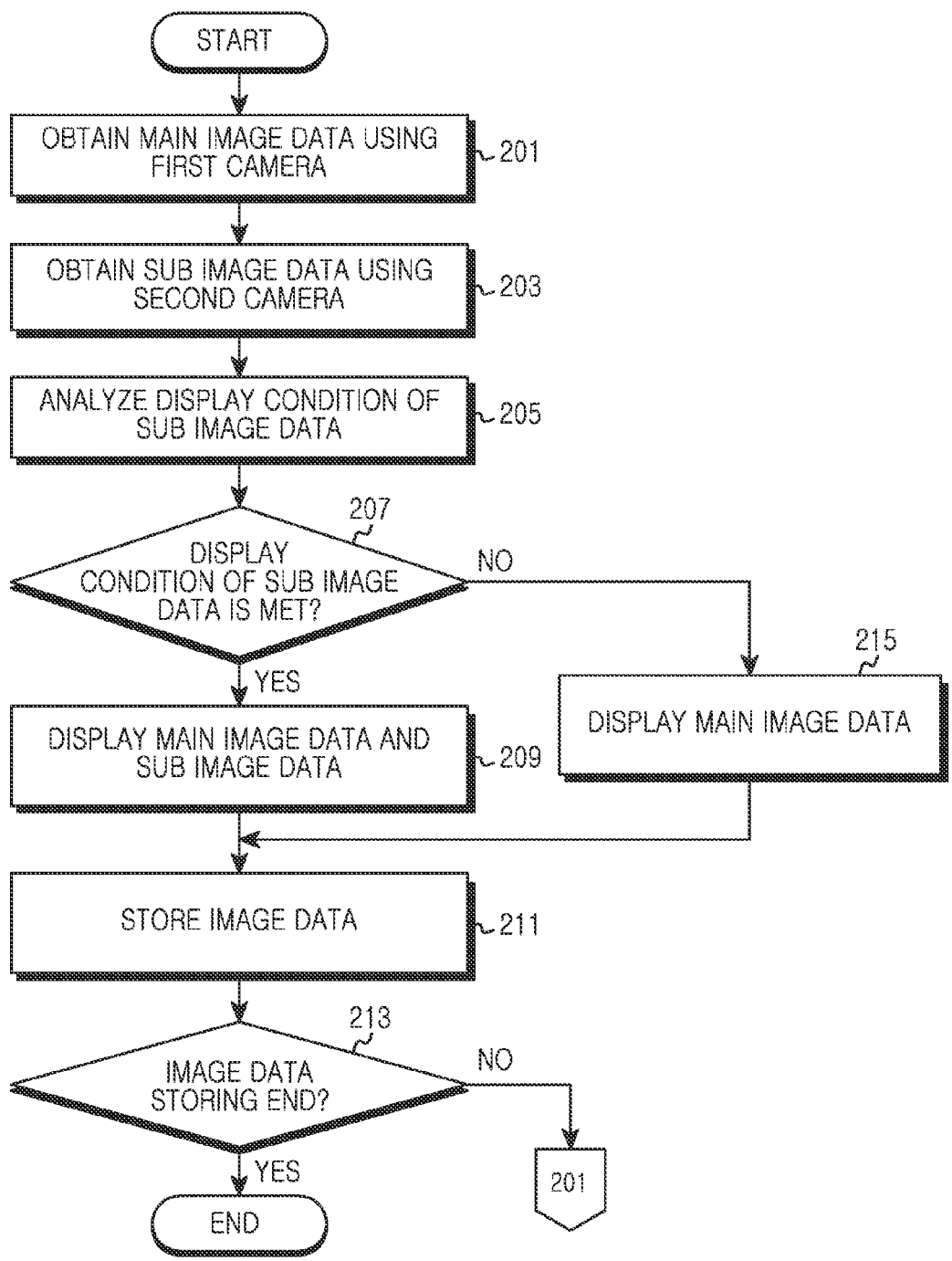
FIG. 2 is a flowchart illustrating a process for storing image data in an electronic device according to an embodiment of the present disclosure.

FIG. 2 is a flowchart illustrating a process for storing image data in an electronic device according to an embodiment of the present disclosure.

Referring to FIG. 2, the electronic device may obtain image data using cameras having different capturing directions, respectively. According to an embodiment of the present disclosure, the electronic device may obtain image data regarding the front side of the electronic device and image data regarding the backside using the cameras disposed in the front side and the backside, respectively, and store them.

The electronic device may obtain main image data using a first camera in operation 201, and proceed to operation 203 to obtain sub image data using a second camera.

Here, the main image data may be image data obtained by capturing an object which a user desires to store using the first camera. The main image data may be displayed in the display unit and simultaneously stored in the memory until an event for ending image data storing occurs.

The sub image data may be image data obtained by capturing an object detected in an angle different from the main image data using the second camera. Unlike the main image data, the sub image data is displayed on the display unit and stored together with the main image data at a period meeting a certain condition. At this point, the sub image data may be merged with the main image data and stored.

For example, the first camera may be a camera disposed in the front side of the electronic device. In this case, the second camera may be a camera disposed in the backside of the electronic device. On the contrary, the first camera may be a camera disposed in the backside of the electronic device. In this case, the second camera may be a camera disposed in the front side of the electronic device.

The electronic device may proceed to operation 205 to analyze a display condition of the sub image data, and proceed to operation 207 to determine the analysis result. Here, the electronic device determines a period for storing image data obtained via the second camera in the memory.

A user of the electronic device may desire to add description regarding captured image data while capturing a landscape or a tourist spot. In this case, the electronic device may obtain image data regarding the landscape or the tourist spot via the first camera, and obtain image data regarding the user via the second camera. Here, the image data regarding the landscape or the tourist spot may be main image data, and the image data regarding the user may be sub image data.

According to an embodiment of the present disclosure, the electronic device may store sub image data (i.e., image data regarding the user) in the case where the user adds description to main image data (i.e., landscape or tourist spot). To perform this operation, the electronic device may analyze image data obtained via the second camera, and when the user's face is included in the image data, determines a period for storing sub image data obtained via the second camera.

The electronic device may analyze the image data obtained via the second camera, and when the user's voice is included in the image data, determine a period for storing sub image data obtained via the second camera.

The electronic device may analyze the image data obtained via the second camera, and when the user's lips move in the image data, determine a period for storing sub image data obtained via the second camera. At this point, the electronic device determines that the user is speaking via the movement of the user's lips included in the image data obtained via the second camera, and determines a period for storing sub image data.

Factors for determining the above-mentioned period for storing sub image data are for determining whether a user describing main image data exists. The electronic device may use at least one of the above-mentioned factors. The electronic device may accurately determine the period for storing image data using a plurality of factors.

The above-mentioned factors are factors for determining the period for storing the sub image data. The electronic device may determine the period for storing the image data using other factors besides the above-mentioned factors.

For example, in the case where the electronic device analyzes sub image data obtained via the second camera and a user who is the same as a user set in advance is included, the electronic device may determine a period for storing the sub image data obtained via the second camera. This is for preventing the sub image data from being stored even when another person besides the user is included in the image data obtained via the second camera.

When determining a display condition of sub image data is met (i.e., a storing condition of sub image data is met) in operation 207, the electronic device may proceed to operation 209 to display main image data and sub image data, and proceed to operation 211 to store displayed image data. Here, the electronic device may additionally display sub image data on a portion of main image data being displayed, and process to store the main image data including the sub image data.

When determining the display condition of the sub image data is not met in operation 207, the electronic device may proceed to operation 215 to display main image data, and proceed to operation 211 to store the main image data being displayed.

As described above, the electronic device that has stored image data proceeds to operation 213 to determine whether storing of image data ends.

When storing of the image data does not end in operation 213, the electronic device may proceed to operation 201 to perform a process for storing image data.

When storing of the image data ends in operation 213, the electronic device ends the present algorithm.

Though the electronic device has obtained image data of different directions using a plurality of cameras in FIG. 2, the electronic device according to an embodiment of the present disclosure may obtain a plurality of objects using one camera having a wide angle of view.

According to an embodiment of the present disclosure, the electronic device classifies one image data captured at a wide angle of view to a main object and a sub object, and when a storing condition of the sub object is met while the electronic device stores only a main object, the electronic device may process to store the main object and the sub object simultaneously.

FIGS. 3A, 3B, 3C, and 3D are views illustrating a screen of an electronic device storing image data according to an embodiment of the present disclosure.

Referring to FIGS. 3A, 3B, 3C, and 3D, the electronic device may provide a function for storing image data.

The electronic device may capture an object using cameras having different capturing directions, respectively. According to an embodiment of the present disclosure, the electronic device has a first camera and a second camera to obtain image data of the front side and image data of the backside with respect to the electronic device. At this point, the first camera may be a camera disposed in the front side, and the second camera may be a camera disposed in the backside.

When detecting a user's gesture for capturing an object, the electronic device operates the first camera and the second camera simultaneously to obtain image data of an object detected in the capturing directions of respective cameras.

At this point, the electronic device may display only image data obtained by a camera selected by a user on a preview screen, and temporarily store image data obtained by an unselected camera. Here, image data displayed on the preview screen may be defined as main image data, and temporarily stored image data may be defined as sub image data. At this point, the electronic device may analyze temporarily stored sub image data to determine a point at which sub image data is displayed.

According to an embodiment of the present disclosure, the electronic device obtains image data regarding an object using two cameras but stores main image data while displaying the main image data on the preview screen. Sub image data may be displayed and stored together with the main image data at a point of meeting a certain condition.

The condition under which the sub image data is displayed on the preview screen may be divided depending on a circumstance of obtaining the image data.

An example of obtaining the image data may be a circumstance where a user explains main image data, and under this circumstance, sub image data may be the user.

In this case, the electronic device may use at least one factor of a face, a voice, and a lip shape of the user as a condition for displaying the sub image data.

For example, it may be assumed that a user captures a face of himself/herself explaining a background image using the first camera (i.e., the camera of the front side) while capturing a neighboring background image using the second camera (ex: the camera of the backside). This circumstance may be executed using a function provided to the electronic device.

In this case, the user sets the second camera capturing the neighboring background image as the main camera, and accordingly the user's neighboring background image captured via the second camera becomes main image data. In addition, the first camera capturing the user's face may be set to a sub camera, and the user's face captured via the first camera may be set to sub image data.

Under this circumstance, in a case of detecting the user's gesture for capturing an object, the electronic device operates the first camera and the second camera simultaneously to obtain main image data and sub image data.

At this point, the electronic device displays the main image data on the display unit and stores the same in the memory simultaneously until the operation of the main camera ends, and processes to temporarily store sub image data. At this point, the sub image data is not displayed on the display unit.

Thereafter, the electronic device may analyze temporarily stored sub image data to determine whether a user's face is detected, whether a user's voice is detected, whether a user's lip shape changes, and the like.

According to an embodiment of the present disclosure, the electronic device may analyze sub image data. When the user's face is detected, the user's voice is detected, or the user's lip shape changes in the sub image data, the electronic device may determine the display condition of the sub image data has been met.

When analyzing the sub image data and determining the display condition of the sub image data has been met, the electronic device may merge the sub image data in the main image data and display the same, and process to store the merged main image data where the sub image data has merged in the memory.

In another example, a circumstance of capturing a user image with main image data used as a background image may be assumed. Under this circumstance, a voice instruction may be used as the condition for displaying sub image data.

For example, it may be assumed that a user captures his/her face together with a background image using the first camera (i.e., the camera of the front side) while capturing a neighboring background image using the second camera (ex: the camera of the backside).

In this case, the user sets the second camera capturing the neighboring background image to the main camera, and accordingly the user's neighboring background image captured via the second camera becomes main image data. In addition, the first camera capturing the user's face may be set to the sub camera, and the user's face captured via the first camera may be sub image data.

Under this circumstance, when detecting the user's gesture for capturing an object, the electronic device operates the first camera and the second camera simultaneously to obtain main image data and sub image data.

At this point, the electronic device displays the main image data on the display unit and stores the same in the memory simultaneously until the operation of the main camera ends, and processes to temporarily store sub image data. At this point, the sub image data is not displayed on the display unit.

Thereafter, the electronic device may determine whether a voice instruction (ex: an instruction, such as start, capture, and the like) is input by a user.

When the voice is input as described above, the electronic device may merge the sub image data in the main image data and display the same, and process the main image data where the sub image data has merged in the memory.

The electronic device obtains image data regarding an object detected in different directions using two cameras, but stores only main image data in the memory while displaying only the main image data on a preview screen, and merges sub image data in the main image data and store the main image data where the sub image data has merged in the memory while displaying the main image data where the sub image data has merged on the preview screen at a point where a condition for displaying the sub image data is met.

FIG. 3A is a view illustrating an electronic device displaying a preview screen that displays data obtained via a camera. The electronic device may incorporate a menu for selecting a capturing method to a preview screen 301. Here, the capturing method may be a method for storing image data 303 and a method for storing video data 305.

When detecting a user's gesture 307 for selecting a capturing method as illustrated in FIG. 3B, the electronic device may display data obtained via a selected capturing method on the preview screen and store in the memory in operation 309, simultaneously as illustrated in FIG. 3C.

Though the drawing has illustrated a situation where only main image data is displayed and stored, when a display condition of sub image data is met, the electronic device may merge the sub image data in the main image data and display the same, as illustrated in operation 311, and simultaneously store the merged image data in the memory as illustrated in FIG. 3D.

Though FIGS. 3A, 3B, 3C, and 3D describe an embodiment where the first camera and the second camera operate simultaneously in order to merge data regarding an object with respect to the front side and data regarding an object with respect to the backside in the electronic device, the electronic device operates one camera independently and only operates the other camera at a point where a condition for image data merger is met to obtain image data regarding an object to merge.

Figure 4B:
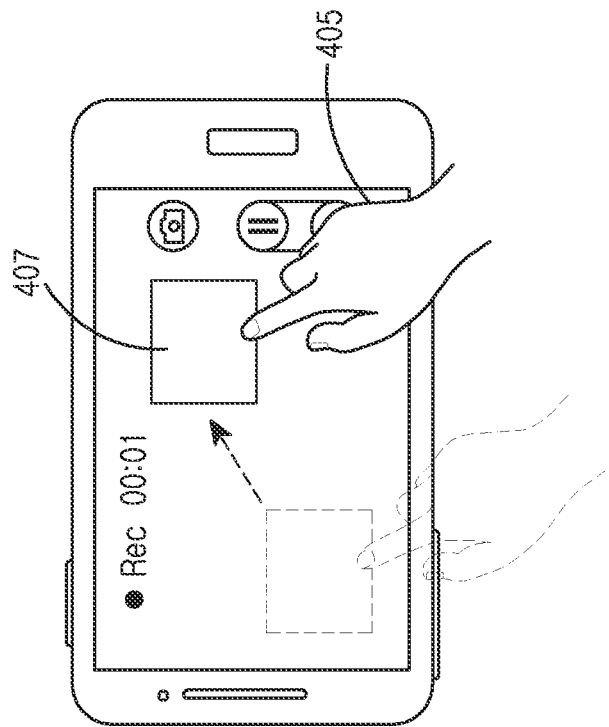
FIGS. 4A and 4B are views illustrating a screen for editing sub image data in an electronic device according to an embodiment of the present disclosure.
Figure 4A:
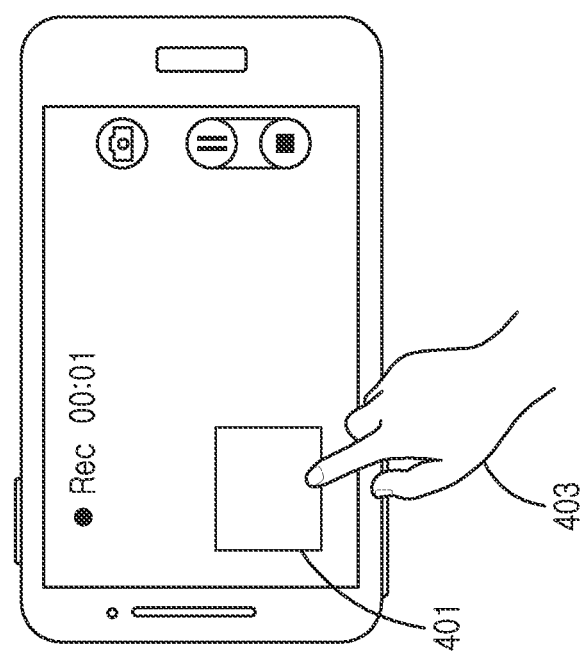

FIGS. 4A and 4B are views illustrating a screen for editing sub image data in an electronic device according to an embodiment of the present disclosure.

Referring to FIGS. 4A and 4B, the electronic device may provide a function for merging and storing image data regarding a plurality of objects.

The electronic device may capture an object using a camera having different capturing directions. According to an embodiment of the present disclosure, the electronic device may have a first camera and a second camera to obtain image data regarding the front side and image data regarding the backside with respect to the electronic device, and merge and store obtained image data. The image data may be classified to main image data and sub image data depending on a user's selection.

Here, the main image data is image data obtained by capturing an object which a user desires to store using the first camera. The main image data may be displayed on the display unit and simultaneously stored in the memory until an event for ending image data storing occurs.

The sub image data is image data obtained by capturing an object detected at an angle different from the main image data using the second camera. Unlike the main image data, the sub image data may be displayed on the display unit and stored together with the main image data at a period where a certain condition is met.

At this point, the electronic device may define a region of main image data where sub image data is to merge in advance, and merge the sub image data in the defined region.

The electronic device may calculate the position and the size of the region that may merge obtained sub image data in every frame, and merge the sub image data so that it is suitable for the calculated position and size.

The reason for calculating the position and size in which sub image data is disposed every frame is for allowing the position and size of sub image data displayed by the user's gesture to change smoothly.

Accordingly, when detecting the user's gesture 403 for changing the position 401 where sub image data merges as illustrated in FIG. 4A, the electronic device may define the position 407 changed in operation 405 by the user as a position where the sub image data merges, and merge the sub image data in the changed position as illustrated in FIG. 4B.

Figure 5B:
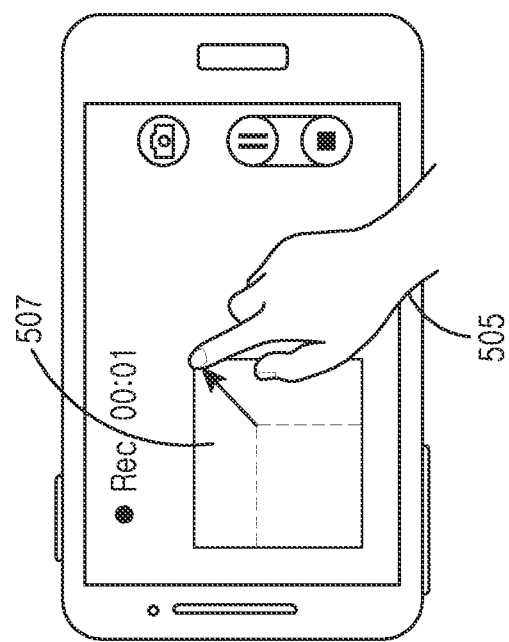
FIGS. 5A and 5B are views illustrating a screen for editing sub image data in an electronic device according to an embodiment of the present disclosure.
Figure 5A:
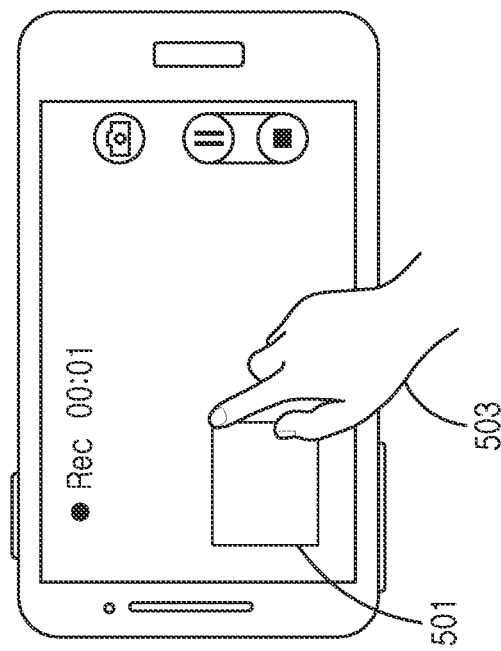

FIGS. 5A and 5B are views illustrating a screen for editing sub image data in an electronic device according to an embodiment of the present disclosure.

Referring to FIGS. 5A and 5B, the electronic device may provide a function for merging and storing image data regarding a plurality of objects.

The electronic device may capture an object using a camera having different capturing directions. According to an embodiment of the present disclosure, the electronic device may have a first camera and a second camera to obtain image data regarding the front side and image data regarding the backside with respect to the electronic device, and merge and store obtained image data.

Here, the main image data is image data obtained by capturing an object which a user desires to store using the first camera. The main image data may be displayed on the display unit and simultaneously stored in the memory until an event for ending image data storing occurs.

The sub image data is image data obtained by capturing an object detected at an angle different from the main image data using the second camera. Unlike the main image data, the sub image data may be displayed on the display unit and stored together with the main image data at a period where a certain condition is met.

At this point, the electronic device may define a region of main image data where sub image data is to merge in advance, and merge the sub image data in the defined region.

The electronic device may calculate the position and the size of the region that may merge obtained sub image data every frame, and merge the sub image data so that it is suitable for the calculated position and size.

The reason for calculating the position and size in which sub image data is disposed every frame is for allowing the position and size of sub image data displayed by the user's gesture to change smoothly.

Accordingly, when detecting the user's gesture 503 for changing the size of a region 501 where sub image data merges as illustrated in FIG. 5A, the electronic device may define a size 507 changed in operation 505 by the user as a size of the region where the sub image data merges, and merge the sub image data suitable for the changed size of the region as illustrated in FIG. 5B.

FIGS. 6A, 6B, 6C, and 6D are views illustrating a screen for editing sub image data in an electronic device according to an embodiment of the present disclosure.

Referring to FIGS. 6A, 6B, 6C, and 6D, the electronic device may provide a function for merging and storing image data regarding a plurality of objects.

The electronic device may capture an object using a camera having different capturing directions. According to an embodiment of the present disclosure, the electronic device may have a first camera and a second camera to obtain image data regarding the front side and image data regarding the backside with respect to the electronic device, and merge and store obtained image data.

Here, the main image data is image data obtained by capturing an object which a user desires to store using the first camera. The main image data may be displayed on the display unit and simultaneously stored in the memory until an event for ending image data storing occurs.

The sub image data is image data obtained by capturing an object detected at an angle different from the main image data using the second camera. Unlike the main image data, the sub image data may be displayed on the display unit and stored together with the main image data at a period where a certain condition is met.

At this point, the electronic device may define a region of main image data where sub image data is to merge in advance, and merge the sub image data in the defined region.

The electronic device may provide various types of regions where sub image data merges. This means a user may select the shape of a region where sub image data merges.

Figure 6A:
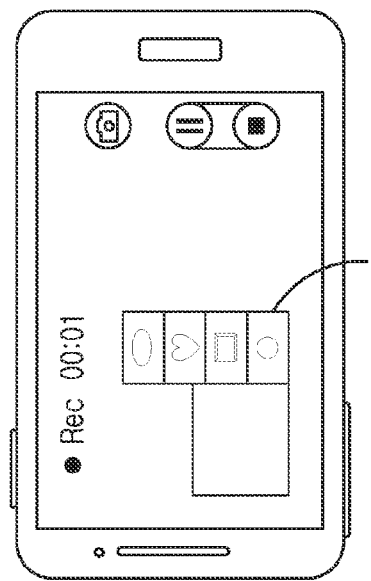
FIGS. 6A, 6B, 6C, and 6D are views illustrating a screen for editing sub image data in an electronic device according to an embodiment of the present disclosure.
Figure 6B:
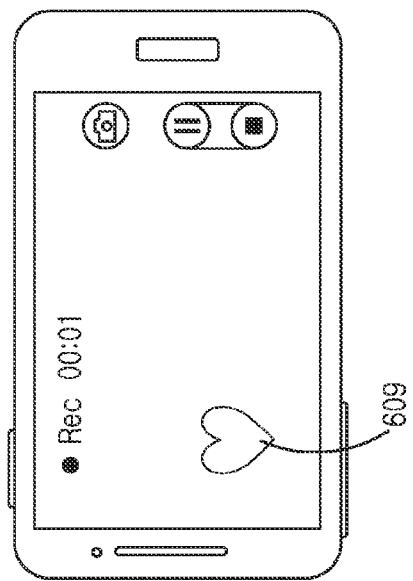

For example, as illustrated in FIG. 6A, when detecting a user's gesture 603 for changing the shape of a region 601 where the sub image data merges, the electronic device may display the shapes of regions where sub image data merges in operation 605 as illustrated in FIG. 6B. A quadrangular region is set in advance in the illustrated drawing and may be changed to an elliptical region, a heart region, a frame region, a speech bubble region, and the like, by a user.

Figure 6C:
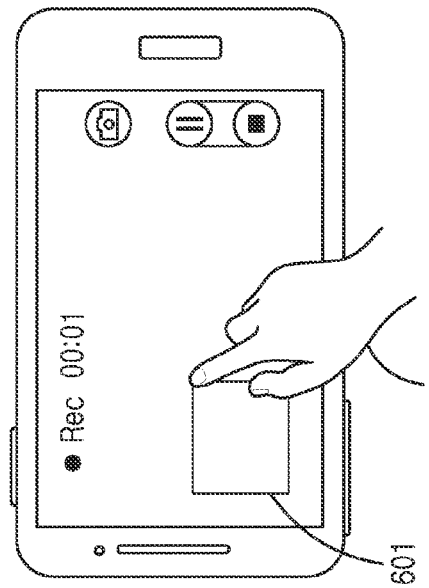
Figure 6D:
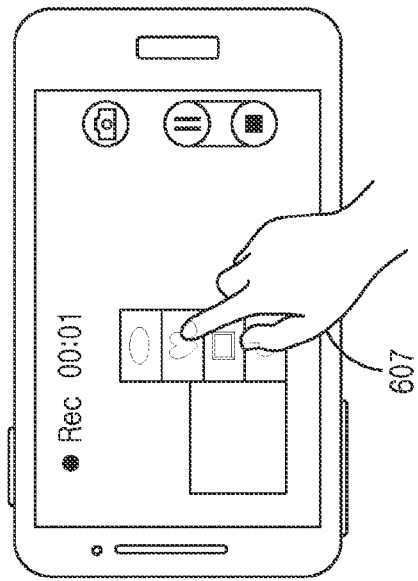

When the shape of a region where sub image data merges which a user desires to change is selected in operation 607 as illustrated in FIG. 6C, the electronic device may change in operation 609 the shape of the region where the sub image data merges to a shape selected by the user as illustrated in FIG. 6D.

FIG. 6C illustrates a situation where the user selects a heart region, and FIG. 6D illustrates a situation where the quadrangular region set in advance has been changed to a heart region.

FIGS. 7A, 7B, 7C, and 7D are views illustrating a process for storing image data in an electronic device according to an embodiment of the present disclosure.

Referring to FIGS. 7A, 7B, 7C, and 7D, the electronic device may have one camera to obtain data regarding an object. A camera of the electronic device may capture a wide area and obtain image data of mega pixels.

A plurality of objects may be detected in image data captured by this camera. Here, the object may be a person, a background image, an animal, and the like.

According to an embodiment of the present disclosure, when determining a plurality of objects detected in image data obtained via the camera, the electronic device may define respective objects as a main object and a sub object, and generate image data where the main object and the sub object have been edited.

Here, editing the main object and the sub object may include editing such that a distance between the main object and the sub object may be constant.

In addition, editing the main object and the sub object may include editing such that the sub object may be included in image data including the main object.

Figure 7B:
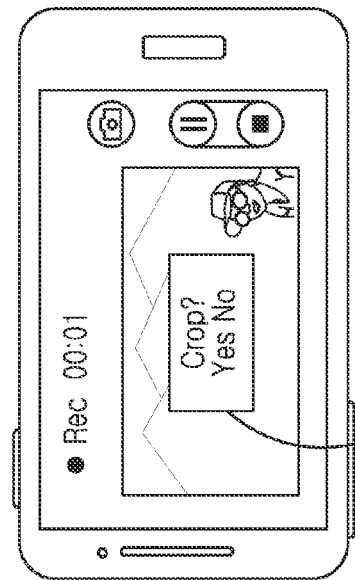
FIGS. 7A, 7B, 7C, and 7D are views illustrating a process for storing image data in an electronic device according to an embodiment of the present disclosure.
Figure 7D:
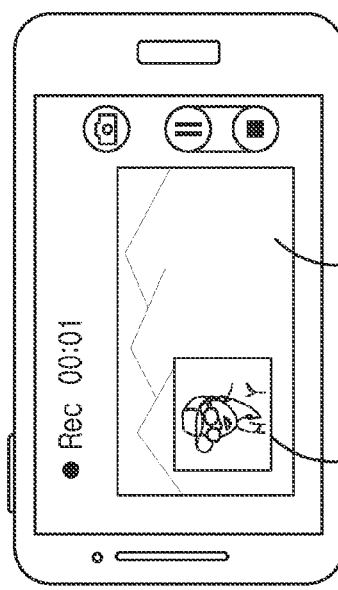
Figure 7A:
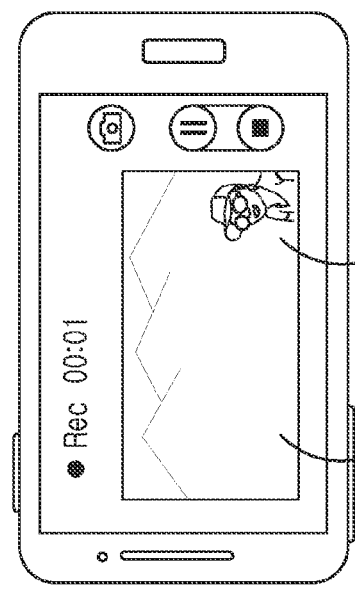

For example, as illustrated in FIG. 7A, the electronic device may obtain image data where a landscape 701 and a person 703 have been captured. A situation of FIG. 7A assumes a situation where a user records a feeling or emotion regarding a mountain being captured in the form of an image while capturing the mountain located far away.

Generally, the electronic device may approach and capture an object located far away by moving a lens of a camera, but in this case, an object located at a close distance cannot be captured simultaneously.

Accordingly, the electronic device may display in operation 705 a menu for editing a main object and a sub object as illustrated in FIG. 7B, and edit the main object and the sub object according to a user's selection.

Figure 7C:
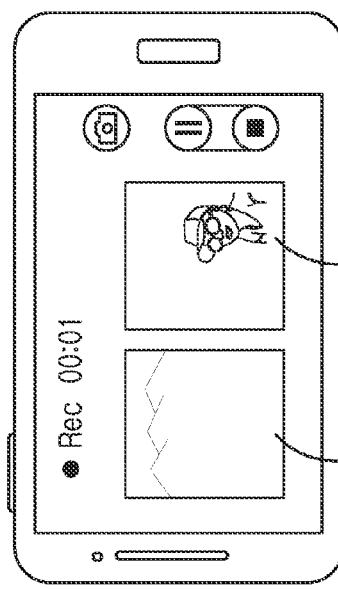

According to an embodiment of the present disclosure, the electronic device crops a main object 707 and a sub object 709 in image data obtained via the camera as illustrated in FIG. 7C, and controls a perspective of each object to edit them such that they are located in the same distance.

In another example, as illustrated in FIG. 7D, the electronic device may crop the main object 707 and the sub object 709 in image data obtained via the camera, and incorporate image data 713 regarding the sub object in image data 711 regarding a main object.

Figure 8B:
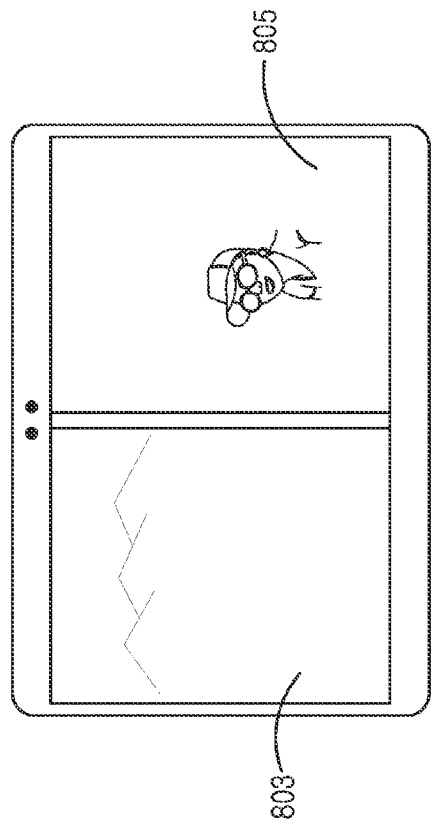
FIGS. 8A, 8B, and 8C are views illustrating a process for storing image data in an electronic device according to an embodiment of the present disclosure.
Figure 8A:
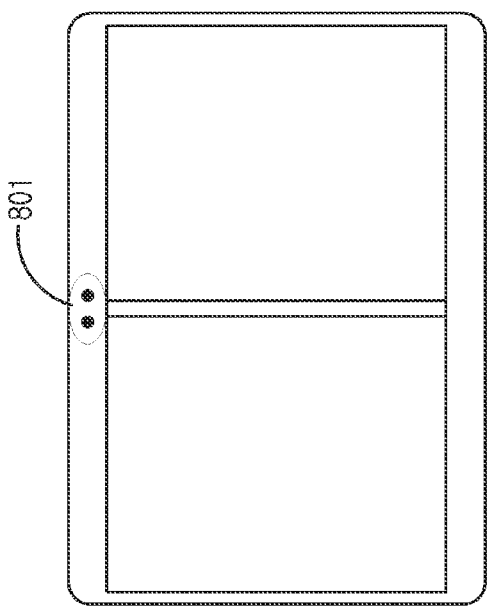
Figure 8C:
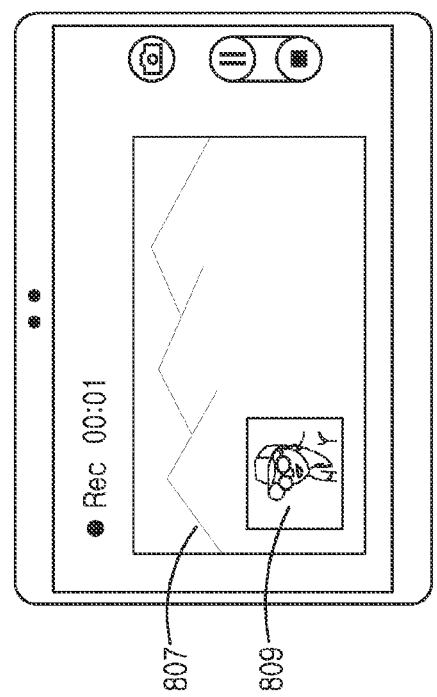

FIGS. 8A, 8B, and 8C are views illustrating a process for storing image data in an electronic device according to an embodiment of the present disclosure.

Referring to FIGS. 8A, 8B, and 8C, the electronic device may provide a function for storing image data.

The electronic device may capture an object using cameras having different capturing directions. According to an embodiment of the present disclosure, the electronic device may have a first camera and a second camera in the front side to obtain a plurality of image data regarding the front side of the electronic device. The first camera and the second camera are cameras for controlling capturing directions, angles, and the like, and have a structure having a fixed position and capable of controlling capturing directions.

When detecting a user's gesture for capturing an object, the electronic device obtains image data corresponding to the capturing directions of the first camera and the second camera, and displays main image data obtained via the first camera and sub image data obtained via the second camera on different display regions of the display unit. At this point, the electronic device obtains and displays image data regarding a capturing angle and a direction set by a user.

At this point, the electronic device may obtain image data regarding a background image, such as a landscape, as main image data, and obtain and display image data regarding the user's face as sub image data.

For example, the electronic device may obtain image data using two cameras 801 capable of controlling a capturing direction as illustrated in FIG. 8A, and may process to display main image data 803 and sub image data 805 on different regions, respectively, as illustrated in FIG. 8B.

In another example, the electronic device may incorporate sub image data 809 to main image data 807 as illustrated in FIG. 8C, and display the same.

Figure 9:
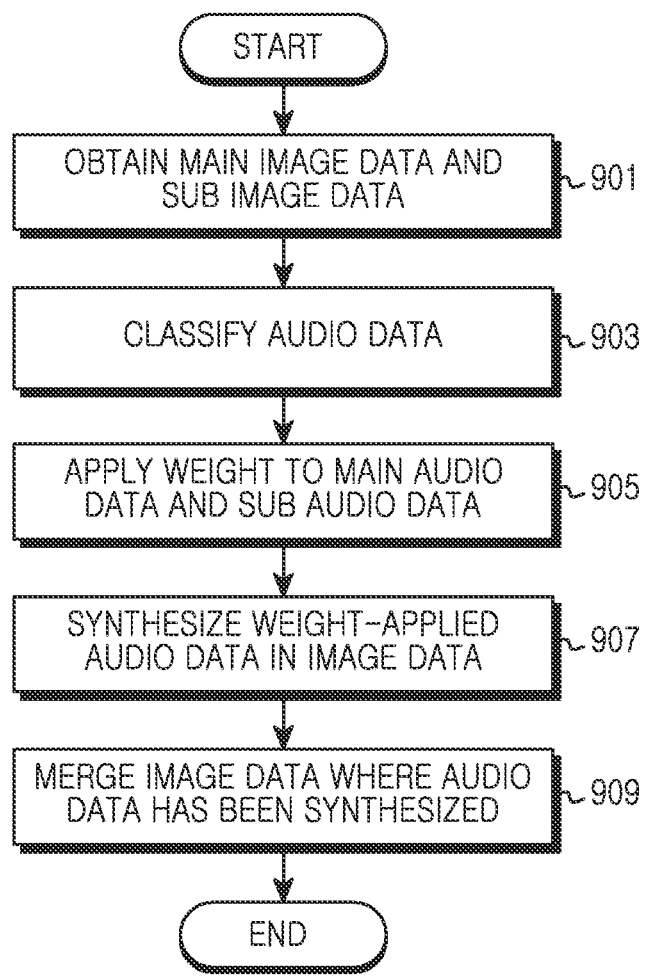
FIG. 9 is a flowchart illustrating a process for processing audio data when storing image data in an electronic device according to an embodiment of the present disclosure.

FIG. 9 is a flowchart illustrating a process for processing audio data when storing image data in an electronic device according to an embodiment of the present disclosure.

Referring to FIG. 9, the electronic device may obtain main image data and sub image data in operation 901.

Here, the main image data is image data obtained by capturing an object which a user desires to store using the first camera. The main image data may be displayed on the display unit and simultaneously stored in the memory until an event for ending image data storing occurs.

The sub image data is image data obtained by capturing an object detected at an angle different from the main image data using the second camera. Unlike the main image data, the sub image data may be displayed on the display unit and stored together with the main image data at a period where a certain condition is met.

The electronic device may classify obtained image data to audio data in operation 903. Here, the electronic device discriminates audio data (main audio data) for main image data and audio data (sub audio data) for sub image data. The electronic device may extract audio data from the main image data and the sub image data based on a mic array and a beamforming technology.

The electronic device may proceed to operation 905 to apply a weight to the main audio data and sub audio data. Here, applying a weight to the audio data denotes controlling sizes of the main audio data and the sub audio data. For example, the electronic device may extract audio data from image data corresponding to a user's face and image data corresponding to a background image, and when audio data (i.e., a user's voice) by the user occurs, the electronic device may process to reduce a background noise so that the user's voice is definitely recorded. When audio data by the user does not occur, the electronic device may process to allow a background note to be recorded as it is.

The electronic device that applies a weight to voice data as described above may proceed to operation 907 to synthesize weight-applied audio data in image data, and proceed to operation 909 to merge the image data where the audio data has merged.

Here, the electronic device synthesizes weight-applied main audio data in main image data, and synthesizes weight-applied sub audio data in sub image data. In addition, the electronic device performs a process for merging main image data and sub image data where audio data has been synthesized and storing the same. According to an embodiment of the present disclosure, the image data where weight-applied audio data has been synthesized may be image data from which a noise of main image data has been removed and where voice of sub image data has become definite.

As described above, the electronic device may provide a function for allowing a user to record feeding regarding a tourist spot while the user captures the tourist spot.

According to an embodiment of the present disclosure, when capturing a moving image in a tourist spot, the electronic device may store a background image in the backside and a user's image and voice on the front side explaining the background image together while capturing them.

At this point, the electronic device may determine a point for storing the user figure using the user face, a lips shape, a voice, and the like.

As described above, the electronic device may store main image data and sub image data simultaneously when storing image data, so that it may omit a process for allowing a user to switch a camera.

In addition, in the case where main image data and sub image data are stored simultaneously, a neighboring noise is removed and so a user's voice may be stored.

It will be appreciated that embodiments of the present disclosure according to the claims and description in the specification can be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present disclosure. Any such software may be stored in the form of a volatile or a non-volatile storage, such as, a storage device like a Read Only Memory (ROM), an erasable or rewritable ROM, or in the form of a memory, such as, a Random Access Memory (RAM), memory chips, device or integrated circuits or on an optically or magnetically readable medium, such as, a Compact Disc (CD), a Digital Versatile Disc (DVD), a magnetic disk, a magnetic tape, or the like. It will be appreciated that the storage devices and storage media are embodiments of machine-readable storage that are suitable for storing a program or programs comprising instructions that, when executed, implement embodiments of the present disclosure. Accordingly, embodiments provide a program comprising a code for implementing an apparatus or a method as claimed in any one of the claims of this specification and a machine-readable storage medium for storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
    operating a first camera and a second camera;
    obtaining first image data through the first camera and second image data through the second camera;
    displaying and storing the first image data from among the obtained the first image data and the second image data;
    determining a state of the second image data by analyzing the second image data while displaying and storing the first image data;
    determining whether the state of the second image data meets a predetermined condition for displaying the second image data; and
    displaying and storing the second image data together with the first image data when the state of the second image data meets the predetermined condition.

2. The method of claim 1, wherein the storing of the second image data together with the first image data comprises:
    merging the second image data with the first image data; and
    displaying the merged image data.

3. The method of claim 2, wherein the merging of the second image data with the first image data comprises:
    changing at least one of a size, a position, and a shape of a region with which the second image data merges.

4. The method of claim 1, wherein the storing of the second image data together with the first image data comprises:
    extracting audio data from the first image data and the second image data; and
    synthesizing, after applying a weight to the extracted audio data, the weight-applied audio data in the image data.

5. The method of claim 1, wherein the obtaining of the first image data and the second image data comprises:
    obtaining the first image data and the second image data using a plurality of cameras having different capturing directions, respectively.

6. The method of claim 5, further comprising:
    displaying the first image data and the second image data captured using the plurality of cameras on different regions of a display.

7. The method of claim 5, further comprising:
    displaying only image data obtained by a camera selected by a user on a preview screen; and
    temporarily storing image data obtained by an unselected camera,
    wherein the image data displayed on the preview screen is the first image data, and the temporarily stored image data is the second image data.

8. The method of claim 5, further comprising:
    storing only the first image data in a memory while displaying only the first image data on a preview screen;
    merging the second image data in the first image data; and
    storing the first image data where the second image data has merged in the memory while displaying the first image data where the second image data has merged on the preview screen at a point where a condition for displaying the second image data is met.

9. The method of claim 5,
    wherein the plurality of cameras operate simultaneously to merge the first image data and the second image data, and
    wherein one camera operates independently and the electronic device only operates another camera at a point where a condition for image data merger is met to obtain image data regarding an object to merge.

10. The method of claim 1, wherein the obtaining of first image data and second image data includes obtaining the first image data and the second image data using one camera.

11. An electronic device comprising:
    a display;
    a first camera;
    a second camera; and
    at least one processor configured to:
        operate the first camera and the second camera,
        obtain first image through the first camera data and second image data through the second camera,
        display and store the first image data from among the obtained image data,
        determine a state of the second image data by analyzing the second image data while displaying and storing the first image data,
        determine whether the state of the second image data meets a predetermined condition for displaying the second image data, and
        control display and storage of the second image data together with the first image data when the state of the second image data meets the predetermined condition.

12. The electronic device of claim 11, wherein the at least one processor is further configured to:
    merge the second image data with the first image data, and
    control display of the merged image data.

13. The electronic device of claim 11, wherein the at least one processes is further configured to change at least one of a size, a position, and a shape of a region with which the second image data merges.

14. The electronic device of claim 11, wherein the at least one processor is further configured to:
   extract audio data from the first image data and the second image data,
   apply a weight to the extracted audio data, and
   synthesize the weight-applied audio data in image data.

15. The electronic device of claim 11, wherein the at least one processor is further configured to obtain the first image data and the second image data using a plurality of cameras having different capturing directions, respectively.

16. The electronic device of claim 15, wherein the at least one processor is further configured to display the first image data and the second image data captured using the plurality of cameras on different regions of the display.

17. The electronic device of claim 15,
   wherein the display is configured to display only image data obtained by a camera selected by a user on a preview screen,
   wherein image data obtained by an unselected camera is temporarily stored, and
   wherein the image data displayed on the preview screen is the first image data, and the temporarily stored image data is the second image data.

18. The electronic device of claim 15, wherein the at least one processor is further configured to:
   store only the first image data in a memory while displaying only the first image data on a preview screen,
   merge the second image data in the first image data, and
   store the first image data where the second image data has merged in the memory while displaying the first image data where the second image data has merged on the preview screen at a point where a condition for displaying the second image data is met.

19. The electronic device of claim 15,
   wherein the plurality of cameras operate simultaneously to merge the first image data and the second image data, and
   wherein one camera operates independently and the electronic device only operates another camera at a point where a condition for image data merger is met to obtain image data regarding an object to merge.

20. The electronic device of claim 11, wherein the at least one processor is further configured to obtain the first image data and the second image data using one camera.

21. A non-transitory computer-readable storage medium storing a program, wherein the program, when executed by an electronic device, configures the electronic device to:
   operate a first camera and a second camera;
   obtain first image data through the first camera and second image data through the second camera;
   display and store the first image data from among the obtained the first image data and the second image data;
   determine a state of the second image data by analyzing the second image data while displaying and storing the first image data;
   determine whether the state of the second image data meets a predetermined condition for displaying the second image data; and
   display and store the second image data together with the first image data when the state of the second image data meets the predetermined condition.

* * * * *